US009819766B1

(12) United States Patent
Nirodi et al.

(10) Patent No.: US 9,819,766 B1
(45) Date of Patent: Nov. 14, 2017

(54) SYSTEM AND METHOD FOR IMPROVING INFRASTRUCTURE TO INFRASTRUCTURE COMMUNICATIONS

(71) Applicant: Google Inc., Mountain View, CA (US)

(72) Inventors: Gautam Suresh Nirodi, Fremont, CA (US); Michael Collins, San Francisco, CA (US); Stephen Anthony Meyers, Oakland, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 14/446,769

(22) Filed: Jul. 30, 2014

(51) Int. Cl.
*H04L 29/06* (2006.01)
*H04L 12/863* (2013.01)
*H04L 12/26* (2006.01)

(52) U.S. Cl.
CPC ......... *H04L 67/40* (2013.01); *H04L 43/0888* (2013.01); *H04L 47/50* (2013.01); *H04L 63/08* (2013.01)

(58) Field of Classification Search
CPC ......... H04L 63/08; H04L 63/20; H04L 67/02; H04L 63/10; H04L 67/145; H04L 67/42; H04L 67/40; H04L 63/0281; H04L 67/14; H04L 47/50; H04L 43/0888
See application file for complete search history.

(56) References Cited

U.S. PATENT DOCUMENTS

| 7,206,844 B2* | 4/2007 | Gupta ................. G06F 9/54 709/203 |
| 7,313,394 B2 | 12/2007 | Bakshi |
| 7,334,125 B1 | 2/2008 | Pellacuru |
| 7,487,539 B2 | 2/2009 | Ramachandran et al. |
| 7,636,767 B2 | 12/2009 | Lev-Ran et al. |
| 8,117,173 B2 | 2/2012 | Gurevich et al. |
| 8,412,856 B2 | 4/2013 | Thaler |
| 8,549,180 B2 | 10/2013 | Critchley et al. |
| 8,689,334 B2 | 4/2014 | Gayde et al. |

(Continued)

OTHER PUBLICATIONS

B. Clifford Neuman "Proxy-based authorization and accounting for distributed systems", IEEE 1993, pp. 283-291.*

(Continued)

*Primary Examiner* — Catherine Thiaw
(74) *Attorney, Agent, or Firm* — Lerner, David, Littenberg, Krumholz & Mentlik, LLP

(57) ABSTRACT

Systems and methods are provided for improving communications between infrastructures using RPCs. An authoritative endpoint in a first infrastructure receives a registration request from a non-authoritative server in a second infrastructure through a transport layer on which a remote procedure call (RPC) layer depends. This request establishes a connection with the authoritative endpoint. The authoritative entity authenticates and registers the non-authoritative entity, and receives RPCs from client devices through the non-authoritative entity. The authoritative entity provides responses to the RPCs through the non-authoritative entity over the established connection. The authoritative entity also performed load-shedding operations, such as notifying the non-authoritative entity of a time to live of the connection. The RPC requests and responses sent over the connection may be chunked into frames, each frame identifying a stream to which it belongs.

11 Claims, 9 Drawing Sheets

(56) References Cited

U.S. PATENT DOCUMENTS

| | | | | |
|---|---|---|---|---|
| 8,799,641 | B1* | 8/2014 | Seidenberg | H04L 63/0876 713/153 |
| 8,984,617 | B1* | 3/2015 | Fausak | H04L 67/42 709/217 |
| 9,438,564 | B1* | 9/2016 | Weng | H04L 63/0281 |
| 2002/0101879 | A1* | 8/2002 | Bouret | H04L 63/0869 370/465 |
| 2003/0135609 | A1* | 7/2003 | Carlson | G06F 9/5011 709/224 |
| 2003/0200329 | A1* | 10/2003 | Delaney | H04L 29/06 709/237 |
| 2005/0154785 | A1* | 7/2005 | Reed | G06F 9/44505 709/217 |
| 2007/0050468 | A1* | 3/2007 | Gazit | G06K 9/228 709/217 |
| 2007/0169015 | A1* | 7/2007 | Seelig | G06F 11/36 717/136 |
| 2008/0046995 | A1* | 2/2008 | Satterlee | H04L 12/4679 726/15 |
| 2008/0092226 | A1 | 4/2008 | Horvath et al. | |
| 2008/0141333 | A1 | 6/2008 | Chen et al. | |
| 2008/0313660 | A1* | 12/2008 | Malik | G06F 9/547 719/330 |
| 2011/0022652 | A1* | 1/2011 | Lai | H04L 67/104 709/202 |
| 2012/0233228 | A1 | 9/2012 | Barton et al. | |
| 2012/0254319 | A1 | 10/2012 | Wheeler | |
| 2013/0315249 | A1* | 11/2013 | Tanimoto | H04L 12/4625 370/392 |

OTHER PUBLICATIONS

Talpey, T. & Callaghan, B. (Jan. 2010). Remote Direct Memory Access Transport for Remote Procedure Call. RFC Internet Engineering Task Force (IETF). 70 pages.

Van Engelen, R. A. (2003). Pushing the SOAP Envelope With Web Services for Scientific Computing. In Proceedings of the International Conference on Web Services (ICWS). pp. 346-352.

* cited by examiner

SYSTEM AND METHOD FOR IMPROVING INFRASTRUCTURE TO INFRASTRUCTURE COMMUNICATIONS

BACKGROUND

Most remote procedure call (RPC) implementations have the following characteristics: exclusive connection use by the RPC request, authentication and authorization procedures performed by RPC servers, and load-balancing for non-authoritative RPC servers. Existing protocols used for RPCs include Simple Object Access Protocol (SOAP), Java Remote Method Invocation (Java RMI), and Common Object Request Broker Architecture (CORBA). However, each of these protocols suffers from one or more of the problems described below.

Regarding exclusivity of connection use by RPC requests, most RPC implementations rely on sending the entire payload constituting the RPC request or response. RPC connections therefore get saturated and cannot be used for other RPCs until all bytes of the previous payload have been read from the connection. The exclusive use of the connection makes it difficult if not impossible to prioritize subsequent RPCs over the same connection.

Regarding authentication and authorization, traditional RPC servers usually implement the authentication and authorization in order to gate requests from RPC clients. Clients initiate connections and pass on credentials to the RPC server and RPC servers rely on authentication and authorization capabilities available on its infrastructure. The tight coupling of authentication/authorization with RPC server capabilities makes it difficult to implement a system wherein the RPC server needs to run in an untrusted environment. For example, for companies acquired by an enterprise, it's conceivable for the parent enterprise to be the trust entity. And therefore, to implement a traditional RPC server running in the acquired company, one would have to partially implement authentication and authorization in the acquired company, leading to fragmentation of trust relationships between the parent and acquired company.

Regarding load balancing for non-authoritative RPC servers, given that traditional RPC servers are always destinations for a connection from RPC clients, traditional RPC servers work well with current mechanisms involving load-balancing that have a higher affinity with the server's network environment. A large number of RPC clients initiate a virtual connection with a load balancer and the load balancer determines which RPC server to connect to based on how heavily the server is loaded. However for situations when the server is non-authoritative, it's the server that initiates connections to the clients via load balanced proxies. While traditional load balancing continues to be useful for this initial connection, as RPC servers begin to get loaded, traditional load balancing schemes will cause the connections to get overused, thus making them ineffective and inefficient.

SUMMARY

Aspects of the disclosure provide for improving communications between infrastructures using RPCs. Such improvements include chunking RPC payloads, performing procedures at one of the infrastructures as opposed to both, and performing load-balancing at one of the infrastructures irrespective of which environment hosts the RPC servers.

One aspect of the disclosure provides a method of sending remote procedure call (RPC) requests, comprising chunking a payload of an RPC request into a plurality of frames, assigning an identifier to each frame, the identifier indicating a given stream to which the frame belongs, including the assigned identifier in a frame header of each frame, and sending the frames over a network. According to some examples, this method may further include detecting network traffic, wherein a size of each of the plurality of frames is adjusted based on the detected network traffic. The frame header for each frame may also indicate a priority of the RPC request. Sending the frames over the network may include multiplexed sending of multiple frames of different sizes and priorities from various RPC requests over a connection.

Another aspect of the disclosure provides a method for establishing a connection, comprising receiving, at an authoritative endpoint in a first infrastructure, a registration request from a non-authoritative server in a second infrastructure, the request received through a transport layer on which a remote procedure call (RPC) layer depends, the request establishing connection with the authoritative endpoint. The authoritative endpoint authenticates and registers the non-authoritative endpoint, and receives RPCs from client devices, the RPCs served through the non-authoritative endpoint, and provides responses to the RPCs through the non-authoritative endpoint. According to some examples, the method further includes notifying the non-authoritative endpoint of an impending connection termination. When the connection is terminated, the authoritative endpoint may enter a lame duck mode in which it serves only in-flight RPCs received through the non-authoritative endpoint.

Yet another aspect of the disclosure provides a system, comprising an authoritative endpoint in a first infrastructure. The authoritative endpoint may include a memory and one or more processors in communication with the memory. The one or more processors are programmed to receive a registration request from a non-authoritative server in a second infrastructure, the request received through a transport layer on which a remote process communications (RPC) layer depends, the request establishing connection with the authoritative endpoint, authenticate the non-authoritative endpoint, register the non-authoritative endpoint, receive RPCs from client devices, the RPCs served through the non-authoritative endpoint, and provide responses to the RPCs through the non-authoritative endpoint. The one or more processors may further be programmed to determine whether the connection established by the non-authoritative endpoint will be terminated, and notify the non-authoritative endpoint of the impending connection termination. In this regard, the non-authoritative endpoint may establish a new connection over which to transmit RPCs.

DETAILED DESCRIPTION

The technology generally relates to systems and method for improving infrastructure to infrastructure communications using RPCs.

According to one aspect, an RPC request and response payload may be chunked, for example, by frames. RPC payloads that allow for chunked up payloads allow RPCs to be multiplexed on the same connection. For example, smaller RPCs sent after a larger RPC payload can reach the server earlier and will be processed sooner than larger RPCs. It is also possible to prioritize one type of RPC over another. For example, RPC chunks can be stamped with a Quality of Service (QoS) identifier, allowing intermediate proxies to prioritize chunks of one RPC over chunks of another.

According to another aspect, RPC servers can serve as authoritative or non-authoritative RPC endpoints. For example, the RPC layer depends on a transport layer to initiate the connection to an authoritative environment where authentication and authorization are implemented. Non-authoritative servers register themselves with a proxy that operates in the authoritative network environment. The proxy can authenticate the client RPC connection and execute various authorization schemes like ACLs, priority, quotas, and billing.

According to another aspect, load-shedding algorithms may be combined to make it possible to load balance non-authoritative server endpoints. Examples of such load shedding protocols include an ability for the connection initiated by the non-authoritative server endpoint to have a predetermined finite time to live (TTL), and an ability for that connection to enter a lame duck mode after the finite TTL has been reached. In lame duck mode, the connection can only be used for RPCs that are currently inflight, but not for initiating any new RPCs on that connection. Further example load shedding protocols include a finite predetermined lame duck interval, after which the authoritative endpoint is free to disconnect and drop any in-flight RPCs, and an ability for the authoritative endpoint to proactively notify the non-authoritative endpoints the amount of time left before the connection will go into lame duck. The non-authoritative endpoint uses this information to establish a standby connection. Once the standby connection is established all new RPCs are transacted using that new connection.

The aspects described above provide a number of advantages. For example, chunking of RPC payloads makes it possible to multiplex the connection and ensure that no one RPC can saturate the connection. It also allows for implementing RPC QoS more effectively. As another example, having the ability of non-authoritative RPC servers enables all authentication and authorization to be enforced by the entity that is authoritative. Policies can be enforced in one place, without needing them to be fragmented by partially implementing checks at the non-authoritative end.

Figure 1:
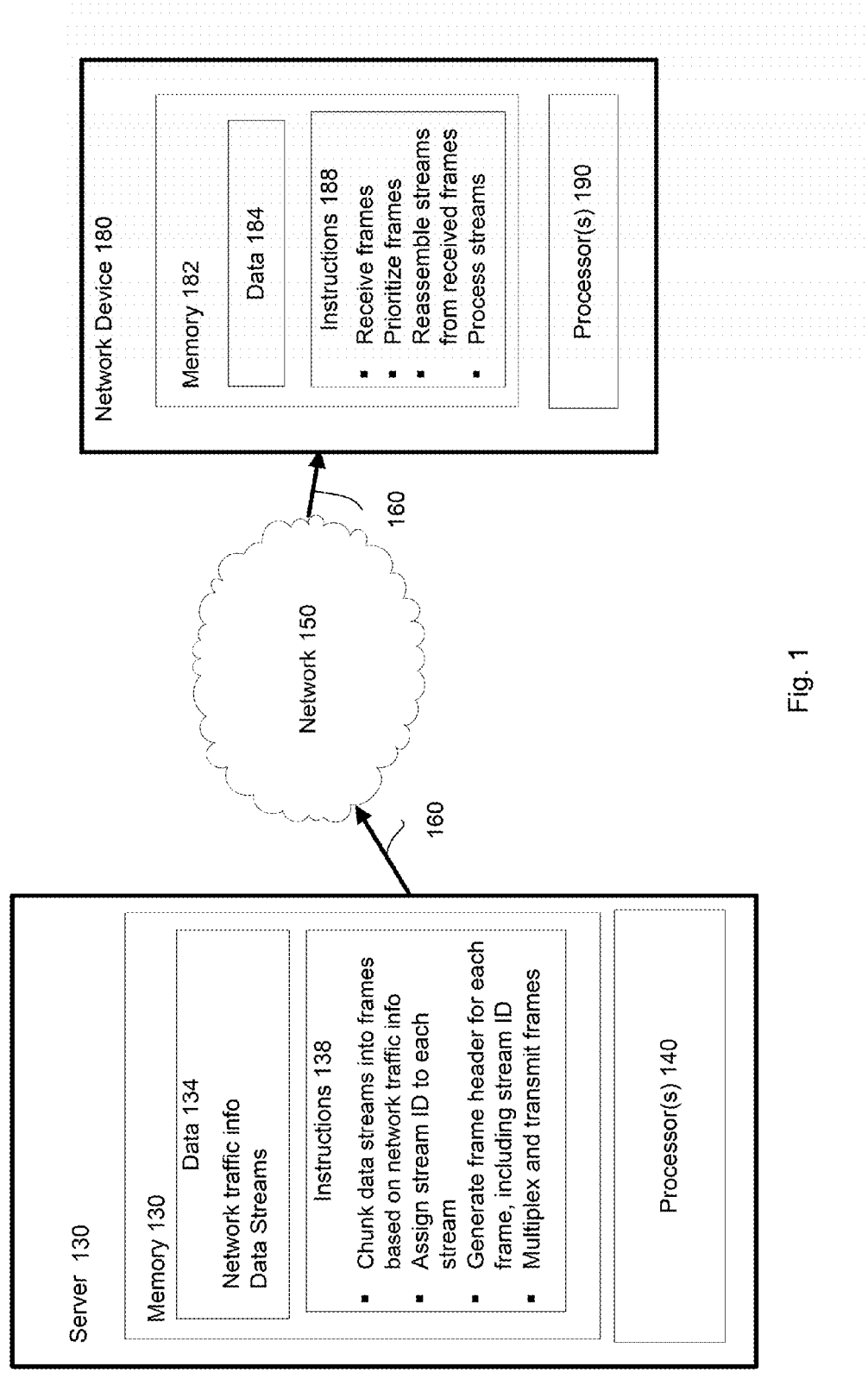
FIG. 1 is an example system diagram according to aspects of the disclosure.

FIG. 1 illustrates an example system 100, in which RPC requests are chunked and transmitted through a network. As shown, server 130 and network device 180 are communicatively coupled through network 150.

The network 150 may be a datacenter, a load-balanced server farm, or any other type of computing environment, including a backplane of interconnected peripherals or a system of components on a motherboard. The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The server 110 may be any type of virtualized or non-virtualized computing device or system of computing devices capable of communicating over a network. Server 110 can contain one or more processors 140, memory 130 and other components typically present in general purpose computing devices. The memory 130 can store information accessible by the one or more processors 140, including instructions 138 that can be executed by the one or more processors 140. In another example, the server 110 may include a hypervisor (not shown) with one or more virtual machines or other guests operating thereon.

Memory 130 can also include data 134 that can be retrieved, manipulated or stored by the processor 140. The memory can be of any non-transitory type capable of storing information accessible by the processor, such as a hard-drive, memory card, ROM, RAM, DVD, CD-ROM, write-capable, and read-only memories.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 140 can be any conventional processors, such as a commercially available CPU. Alternatively, the processors can be dedicated components such as an application specific integrated circuit ("ASIC") or other hardware-based processor. Although not necessary, the server 130 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Although only one server 110 is depicted in FIG. 1, it should be appreciated that a typical system can include a large number of connected computing devices, with each different computing device being at a different node of the network 150. For example, the server 110 may be connected to a plurality of client computing devices through the network 150 or through another network (not shown). In serving requests from the client devices, the server 110 may send requests, such as RPCs, to the network device 180. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

The network device 180 may be configured similarly to the server computing device 110, with one or more processors 190 and memory 182, including data 184 and instructions 188 as described above. In one example, the network device 180 may be a personal computing device having all of the components normally used in connection with a personal computing device, such as a central processing unit (CPU), memory (e.g., RAM and internal hard drives) storing data and instructions, a display (e.g., a monitor having a screen, a touch-screen, a projector, a television, or other device that is operable to display information), user input device (e.g., a mouse, keyboard, touch-screen or microphone), and all of the components used for connecting these elements to one another. In another example, the network device 180 may be a server or client computing device within a different computing infrastructure. For example, the network device 180 may be a network server connected to and serving one or more client computing devices, and the server 110 may be an application server serving a plurality of network servers.

Although either or both of the server 110 and network device 180 may comprise a full-sized personal computing device, they may alternatively comprise mobile computing devices capable of wirelessly exchanging data with a server over a network such as the Internet. By way of example only, either device may be a mobile phone or a device such as a wireless-enabled PDA, a tablet PC, or a netbook that is capable of obtaining information via the Internet. In another example, either device may be a head-mounted computing system. As an example the user may input information using a small keyboard, a keypad, microphone, using visual signals with a camera, or a touch screen.

As mentioned above, the server 110 may send RPC requests to the network device 180 through the network 150. Each RPC request may take the form of one or more data streams. Such data streams may be chunked, for example, based on an amount of network traffic detected by the server 110. For example, payloads of the RPC requests may be chunked into a plurality of frames. Each frame may include a header, the header including a stream identifier (ID) indicating to which stream the frame belongs. As such, multiple frames of different sizes from different streams may be sent over a connection 160, such as through the network 150. In this regard, network device 180 may receive and prioritize the frames, without smaller frames getting delayed by larger preceding frames. For example, prioritization may be based on a type of RPC, a size of the frame, or any other information. Accordingly, the network device 180 may reassemble the streams from the received frames, and process the requests in the reassembled streams.

Figure 2:
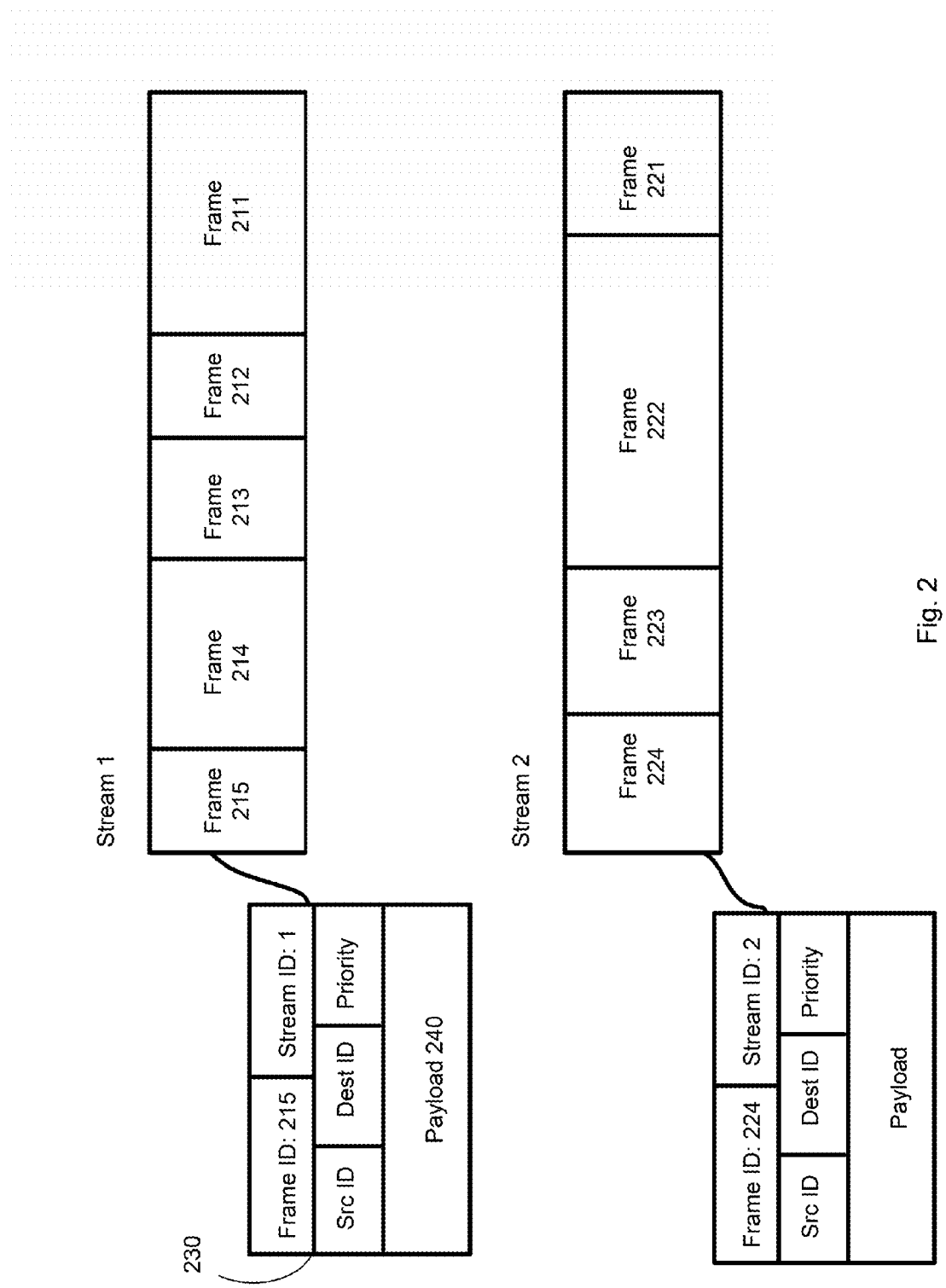
FIG. 2 is diagram illustrating chunking of RPC requests into frames according to aspects of the disclosure.

FIG. 2 illustrates an example of RPC request payloads chunked into frames, each frame belonging to a given stream. As shown, Stream 1 has been chunked up into five frames 211-215. The size of each frame 211-215 may differ, for example, depending on contents of the payload, network traffic, or other information. Moreover, while five frames are shown in FIG. 2, the stream may be chunked up into any number of frames.

Similar to the Stream 1, a second stream (Stream 2) may also be chunked into frames 221-224. The number and sizes of frames in each stream may differ from one stream to the next.

For each frame 211-215 and 221-224, a header may be generated. For example, as shown, the frame 215 includes header 230 and payload 240. The header 230 includes a frame ID, a stream ID, transmission information, and other information associated with the frame. The frame ID may indicate an order of the frame in a given stream, while the stream ID indicates the stream to which the frame belongs. In this regard, all of the frames 211-215 and 221-224 may be sent over a multiplexed transmission line, and a device receiving the frames can order and restructure the frames into the streams 1 and 2. The transmission information may include, for example, a source address and destination address for the frame. Other information associated with the frame may include, for example, a type of RPC request, a priority for the frame, a size of the frame, or the like. As shown, each frame of Stream 2 also includes a header and a payload with similar information to that described above with respect to the frame 215.

Because payloads of RPC requests are chunked via frames, frames of smaller RPC requests may reach their destination sooner than if the requests were not chunked. According to one example, RPC responses may also be chunked similar to the chunking of the requests described above. For example, the Stream 1 and Stream 2 in FIG. 2 may each represent an RPC response.

According to one example, streams may have different priorities. The priorities may be used to provide Quality of Service (QoS). The priority of each stream may be determined, for example, via annotations on the RPC method definition. For example, an RPC method definition for an E-Commerce transaction may be annotated as a high priority method compared to an RPC method that retrieves the status of an order. In this scenario, both RPCs may involve comparably small payloads, but the RPC client will prioritize sending the transaction over the RPC that queries the order status. Similarly the RPC server can prioritize sending the response to the transaction over the response to the order status query.

Figure 3A:
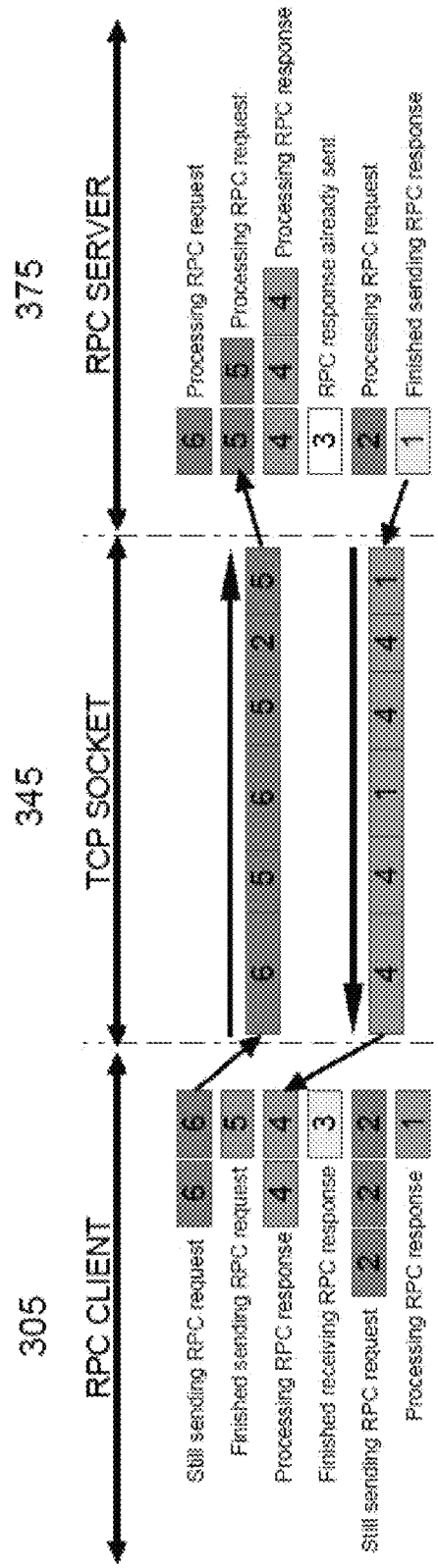
FIG. 3A illustrates an example of transmission and receipt of chunked RPCs according to aspects of the disclosure.

FIG. 3A illustrates an example of transmission and receipt of multiple chunked streams corresponding to RPC requests and responses. In this example, an RPC client is sending RPC requests 6, 5, and 2 over TCP socket 345 to RPC server 375. Each of requests 6, 5, and 2 may be chunked into a number of frames, where the number of frames may vary between requests. For example, request 6 is chunked into five frames, where two frames are still being sent by RPC server 305, two frames are being transmitted over TCP socket 345, and one frame has been received and is being processed by RPC server 375. Similarly, request 5 is chunked into six frames, and request 2 is chunked into five frames. The number of frames vary based on, for example, a size or priority of the RPC request. As shown, the frames of requests 6, 5, and 2 are multiplexed as they are transmitted over TCP socket 345. The frames may each include an identifier indicating to which request they belong, thus enabling the RPC server 375 to reassemble the requests. Larger RPC requests, such as request 2, do not block the smaller requests.

The RPC server 375 may begin processing the RPC requests 6, 5, and 2 as soon as it receives one or more frames of the request. For example, as shown, the RPC server 375 has received one frame of RPC request 6, two frames of RPC request 5, and one frame of RPC request 2. Accordingly, the RPC server 375 has begun processing each of these requests, including assembling request 5.

While RPC server 375 is receiving, assembling, and processing RPC requests 6, 5, 2, it may also chunk and send RPC responses 4, 3, and 1. Similar to the requests, the responses 4, 3, 1 are chunked into frames which may vary in number and size from one response to another. The responses are transmitted over a multiplexed connection to the RPC client 305, which receives, reassembles, and processes the responses 4, 3, 1. Larger responses, such as response 4, do not block smaller responses, such as response 3. Moreover, RPCs that were quickly processed by the server 375, such as response 3, may arrive at the client 305 ahead of slower RPC responses 1, 4.

Figure 3B:
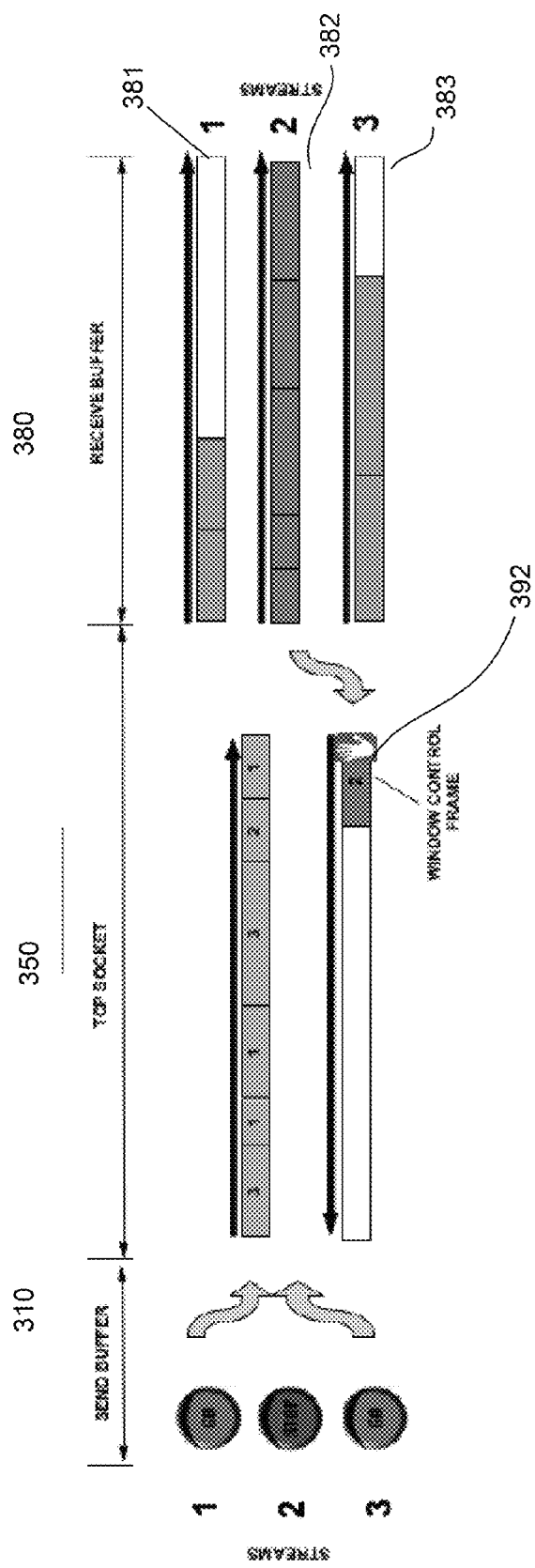
FIG. 3B illustrates an example of RPC flow control according to aspects of the disclosure.

FIG. 3B illustrates an example of RPC flow control. RPC servers and clients may use flow control frames to prevent buffer overflows. Flow control for one RPC does not impact other RPCs that can be processed. For example, client 310 may send streams 1, 2, 3 of chunked RPC requests to server 380. As the server 380 receives frames corresponding to each stream 1, 2, 3, the server 380 reassembles the frames as mentioned above in connection with FIG. 3A. For example, the server 380 may identify a stream to which each frame belongs based on its frame header and may temporarily store the frames in a corresponding buffer 381, 382, 383. In the example shown, the frame buffer 381 corresponds to the RPC request stream 1, the frame buffer 382 corresponds to the RPC request stream 2, and the frame buffer 383 corresponds to the RPC request stream 3. Buffers 381, 383 have capacity to receive more frames. However, because RPC request 2 is very large, the server 380 is close to overrunning its buffer 382 for the request 2. Accordingly, the server 380 may send a control frame 392 to the client 310 to temporarily stop the client 310 from sending additional data frames of RPC request 2. Similar to the data frames, the flow control frame 392 may include a frame header identifying the stream to which it belongs. Accordingly, the client 310 receives flow control frame 392 and suspends transmission of data frames for RPC request 2. The client 310 may continue to send, and the server 380 may continue to receive, data frames for requests 1, 3.

The same flow control scheme can be used for RPCs involving large responses. For example, if a client device's response buffer for one or more given responses was close to overrunning, the client may send flow control frames to the server to temporarily suspend the server from sending more frames for the one or more given responses. Because the responses are chunked, the client could continue processing other responses.

Figure 4:
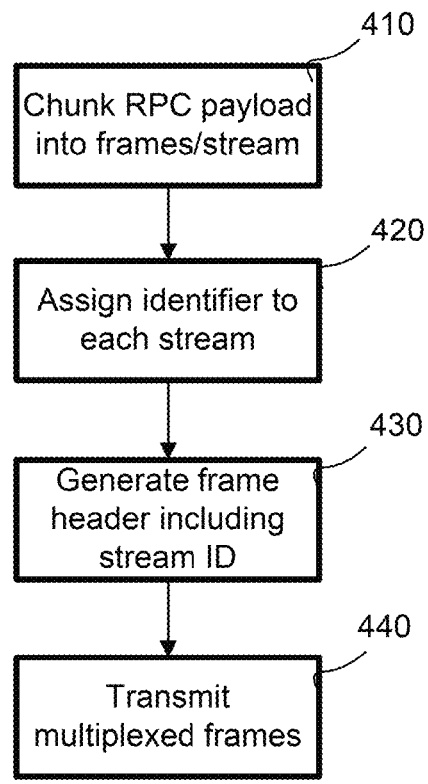
FIG. 4 is an example flow diagram illustrating a method of chunking RPC requests according to aspects of the disclosure.

FIG. 4 illustrates an example method 400 of chunking and transmitting RPC communications, including requests and responses. In block 410, a payload of an RPC is chunked into frames. The frames may be part of one or more streams. The frames may vary in size based on, for example, a type of the RPC, network traffic, or other information.

In block 420, an identifier is assigned to each stream. In block 430, a frame header is generated for each frame, the frame header including at least the stream ID.

In block 440, the frames are transmitted over a multiplexed connection. In this regard, frames of smaller RPCs may reach their destination quickly without being caught behind larger RPCs.

Figure 5A:
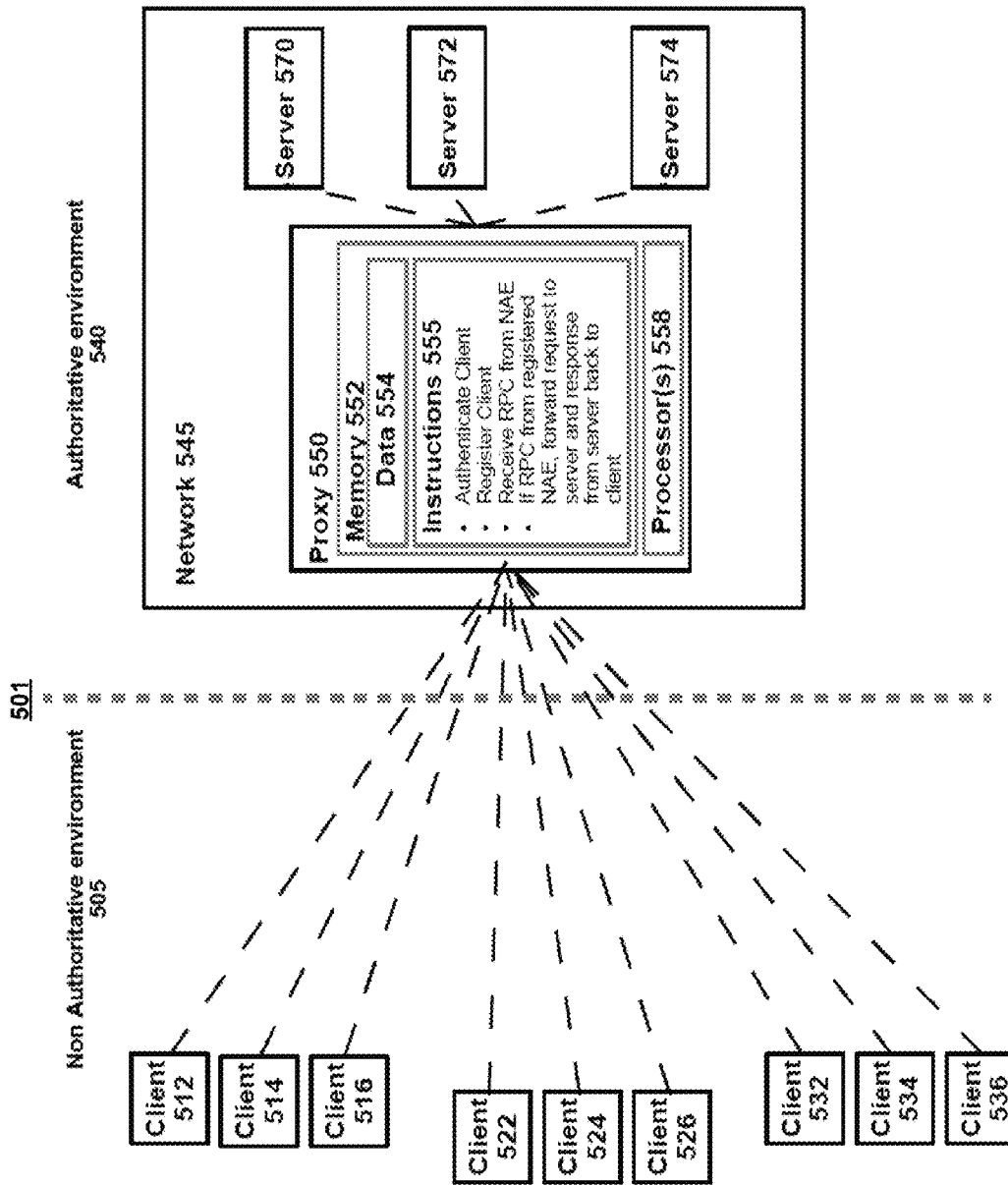
FIGS. 5A-B are example system diagrams according to aspects of the disclosure.
Figure 5B:
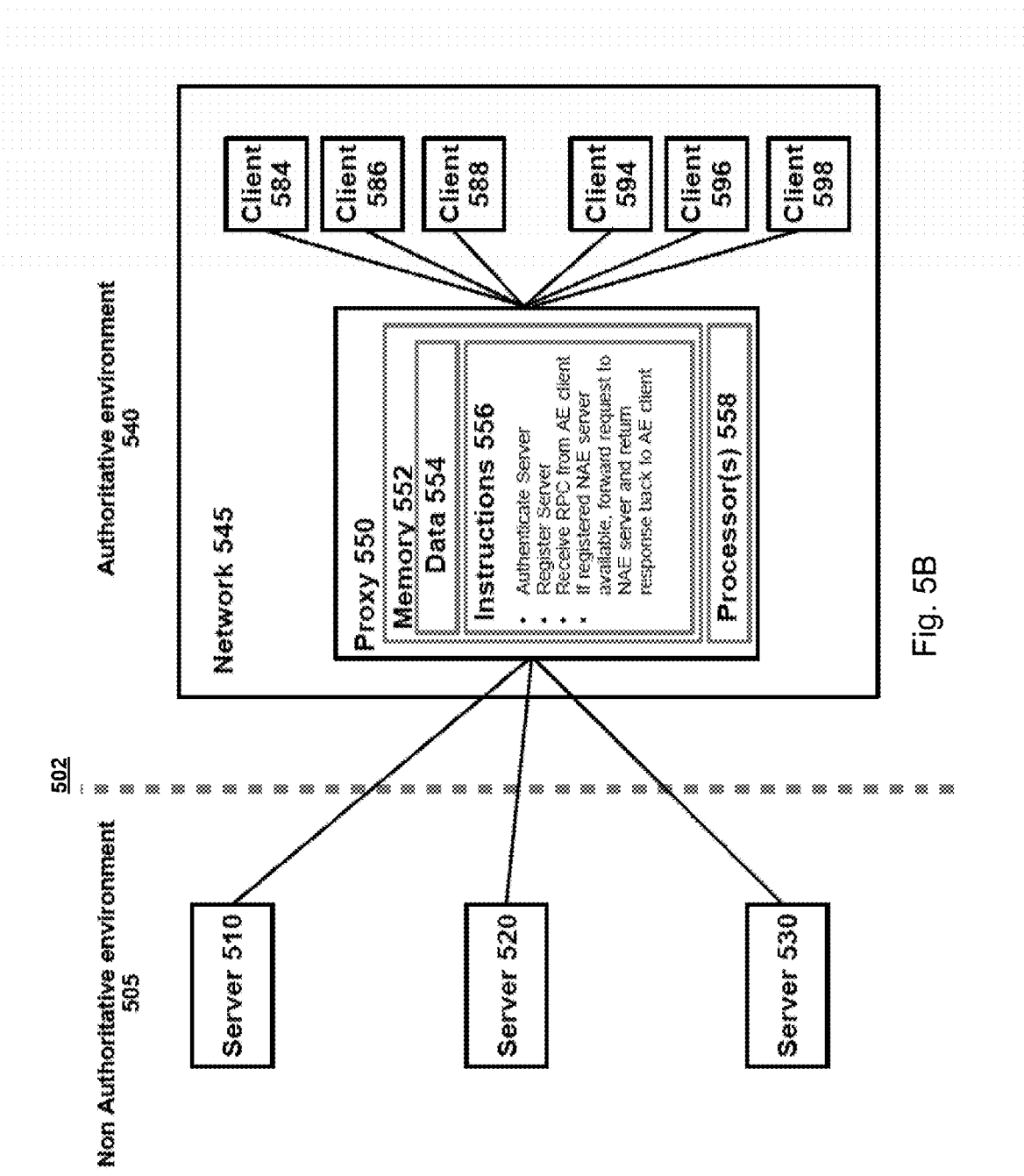

FIGS. 5A-5B illustrate example systems 501, 502 providing for communication between devices in a first infrastructure and a second infrastructure. Each infrastructure may be, for example, a datacenter, a cloud, or any type of network. In each example, one infrastructure may serve as a non-authoritative environment 505 while the other infrastructure serves as an authoritative environment 540.

As shown in FIG. 5A, non-authoritative environment 505 includes one or more client computing devices 512-516, 522-526, 532-536. The client computing devices 512-516, 522-526, 532-536 may each belong to one or more networks or infrastructures. While a few client computing devices 512-516, 522-526, 532-536 are shown, any number of clients may be included.

Each of the client computing devices 512-516, 522-526, 532-536 is coupled to a device in authoritative environment 540. For example, authoritative environment 540 includes network 545, which may be, for example, a datacenter. Network 545 includes proxy 550 and authoritative servers 570, 572, 574.

The proxy 550 may provide the security architecture for the entire network 545. Proxy 550 may be, for example, a computing device such as a server or dedicated host. The proxy 550 includes memory 552 and one or more processors 558. The memory 552 and processors 558 may be any of a variety of types, similar to the memory 130 and processors 140 described above in connection with FIG. 1. For example, the memory 552 may include data 554 and instructions 555. The instructions 555 may provide for authenticating a non-authoritative entity, registering the non-authoritative entity, receiving an RPC, determining whether the RPC was received from a registered non-authoritative entity, and if so, providing a response to the RPC.

In some examples, upon receiving an RPC from a non-authoritative endpoint, such as server 510-530, the authoritative endpoint, such as the proxy 550, may determine whether the non-authoritative endpoint has been registered prior to providing a response to the RPC. For example, if the non-authoritative endpoint has not been registered, the proxy 550 may commence authentication and authorization processes, as opposed to or prior to responding to the RPC.

As shown in FIG. 5B, non-authoritative environment 505 includes non-authoritative servers 510, 520, 530. While each of the servers 510-530 may be part of the same network, it should be understood that the servers 510-530 may each belong to a separate network or infrastructure. Moreover, while only three servers are shown, any number of servers may be included.

In the system 502, authoritative environment may similarly include network 545 and proxy 550. However, in this example, the network 545 includes client devices 584-588 and 594-598 coupled to the proxy 550. Moreover, in this example, the proxy 550 may include instructions 556, which may be specific to communicating with a non-authoritative server (as opposed to a non-authoritative client). As such, the instructions 556 may provide for authenticating and registering the server, receiving RPC requests from authoritative client 584-588, 594-598, forwarding the requests to one or more registered non-authoritative servers if such servers are available, and forwarding the responses back to the client.

According to one example, the server 510 initiates a registration request. For example, the server 510 may initiate the registration request as soon as it is booted. In turn, the proxy 550 may authenticate and register the server 510, similar to the process described above in connection with FIG. 5A. For example, the non-authoritative server 510 may initiate a connection with the proxy 550 through a transport layer on which an RPC layer depends. Through this connection, the proxy 550 may authenticate and register the non-authoritative server 510. For example, the proxy 550 may execute various authorization schemes, such as authenticating service registrations, access control lists (ACLs), priority, quotas, and billing. Once registered, the proxy makes itself available to RPC clients in the authoritative environment, such as clients 584-588 and 594-598. When a client, for example client 584, seeks to invoke RPCs on a non-authoritative server, such as the server 510, it finds the proxy 550 and sends the RPC request to it. The proxy 550, in turn, forwards the request to the server 510 in the non-authoritative environment 505. The RPC request may be chunked by the client 584, as discussed above in connection with FIGS. 1-4. The proxy 550 receives the chunks, and forwards them to the server 510. The server 510 assembles the chunks, interprets the request and constructs responses that are once again chunked before sending them to proxy 550. The proxy 550 forwards the RPC response chunks to the RPC client 584 that assembles the response chunks to interpret the RPC response.

In either system 501, 502, the entities in the non-authoritative environment may be load balanced, for example, using load-shedding algorithms. For example, the connection initiated by the non-authoritative entity (e.g., servers 510-530) may have a predetermined finite time to live (TTL). For example, the connection may expire after several microseconds, seconds, minutes, hours, etc. When the predetermined finite TTL has been reached, the connection enters into a lame duck mode. In the lame duck mode, the connection is used for RPCs that are currently in flight, but not for initiating any new RPCs on that connection. For example, if a connection established by the server 510 with the proxy 550 reaches its TTL, and the server 510 is still waiting to process a response to an RPC request, the connection will remain so that the server 510 can receive the response. However, the proxy 550 will not use that connection to forward any new RPC requests to server 510 after the connection enters lame duck mode. According to some examples, a lame duck period may also have a predetermined finite TTL, which may be shorter than the TTL for sending new RPCs over the connection.

Further load-shedding algorithms include providing the authoritative endpoint with an ability to proactively notify the non-authoritative entities of an amount of time left before the connection will enter lame duck mode. For example, the proxy 550 may send a notification to the server 510 over the connection established that the connection will reach its finite TTL in 10 seconds. As such, the non-authoritative entity can use this information to establish a new connection. The new connection can be used for all new RPCs.

Figure 6:
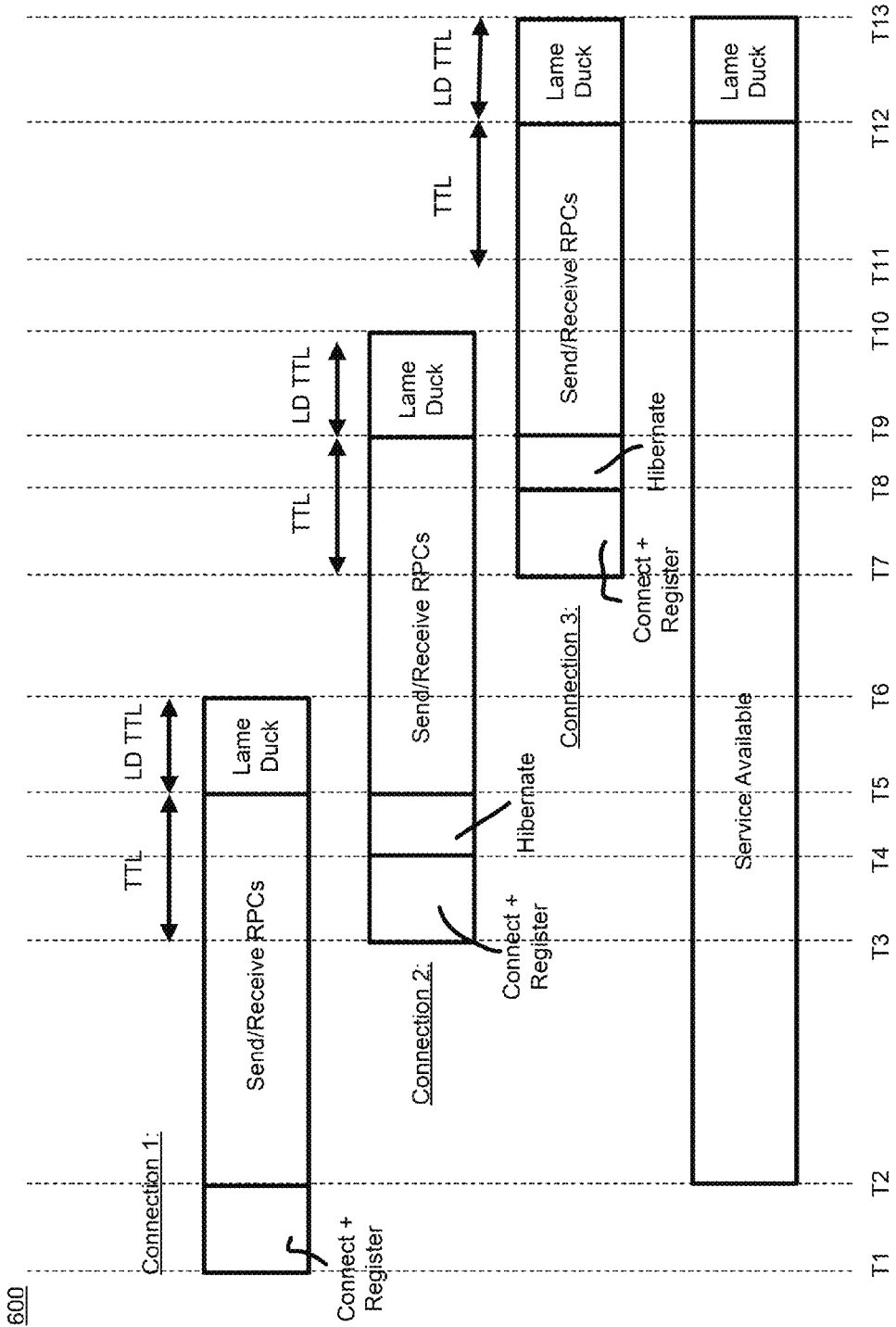
FIG. 6 is an example timing diagram according to aspects of the disclosure.

FIG. 6 illustrates an example timing diagram 600 for the load-shedding techniques discussed above. At time T1, Connection 1 is established. For example, referring back to FIG. 5, one of the non-authoritative servers, such as the server 510, may initiate a connection with the proxy 550. The process of authenticating and registering the server 510 at the proxy 550 takes place between time T1 and time T2. At time T2, the server 510 can commence sending and receiving RPCs to and from the proxy 550 over the established Connection 1. At time T3, the proxy 550 sends a notification to the server 510 indicating that the TTL for the Connection 1 will soon run out. Accordingly, the server 510 may establish a new connection, such as Connection 2. The new connection may be established with another proxy in the authoritative environment.

At time T4, the TTL for Connection 1 has not yet run out, but the server 510 has completed connection and registration with the new proxy. Accordingly, the Connection 2 may remain dormant until the TTL of Connection 1 expires at time T5. For example, the server 510 may continue to send and receive RPCs over the Connection 1, and may maintain Connection 2 without yet sending communications over it.

At time T5, the TTL of Connection 1 has run out, and therefore Connection 1 enters into lame duck mode. In this mode, no new RPCs are sent over the Connection 1. However, any RPCs that were already in flight may finish transmitting. Any new RPCs are instead sent over the Connection 2 between the server 510 and the new proxy. At time T6, the lame duck TTL for the Connection 1 is over. Accordingly, the Connection 1 may be torn down.

At time T7, the new proxy with which Connection 2 was established sends a notification to the non-authoritative server 510 that the TTL for Connection 2 is approaching. Accordingly, the non-authoritative server 510 establishes Connection 3, for example, with yet another proxy in the authoritative environment. Once the Connection 3 is established, if the TTL for Connection 2 has not yet run out, the Connection 3 may remain in hibernation until time T9. At this time, the TTL for Connection 2 is over, Connection 2 enters lame duck mode, and the server 510 begins transmitting and receiving new RPCs over Connection 3. At time T10, the lame duck period for Connection 2 is over.

Similar to the above, at time T11 the authoritative endpoint with which the Connection 3 is established notifies the non-authoritative server 510 that the Connection 3 TTL is about to run out. At time T12 the TTL for Connection 3 is over, and the Connection 3 enters lame duck mode until time T13. For example, the lame duck period may last a predetermined time, or may last until any in-flight RPCs between the authoritative and non-authoritative endpoints are complete.

In view of the Connections 1, 2, and 3 established, service between the authoritative and non-authoritative environments is available between the time T2 (when registration of the non-authoritative server over Connection 1 is complete) and the time T12 (when the TTL for Connection 3 runs out).

The load-shedding techniques described above make it unnecessary to distribute load-balancing infrastructure. For example, the load shedding may work in conjunction with service registration. Because the load-shedding is managed by the authoritative environment, the non-authoritative servers do not need to implement separate load-balancing protocols.

Figure 7:
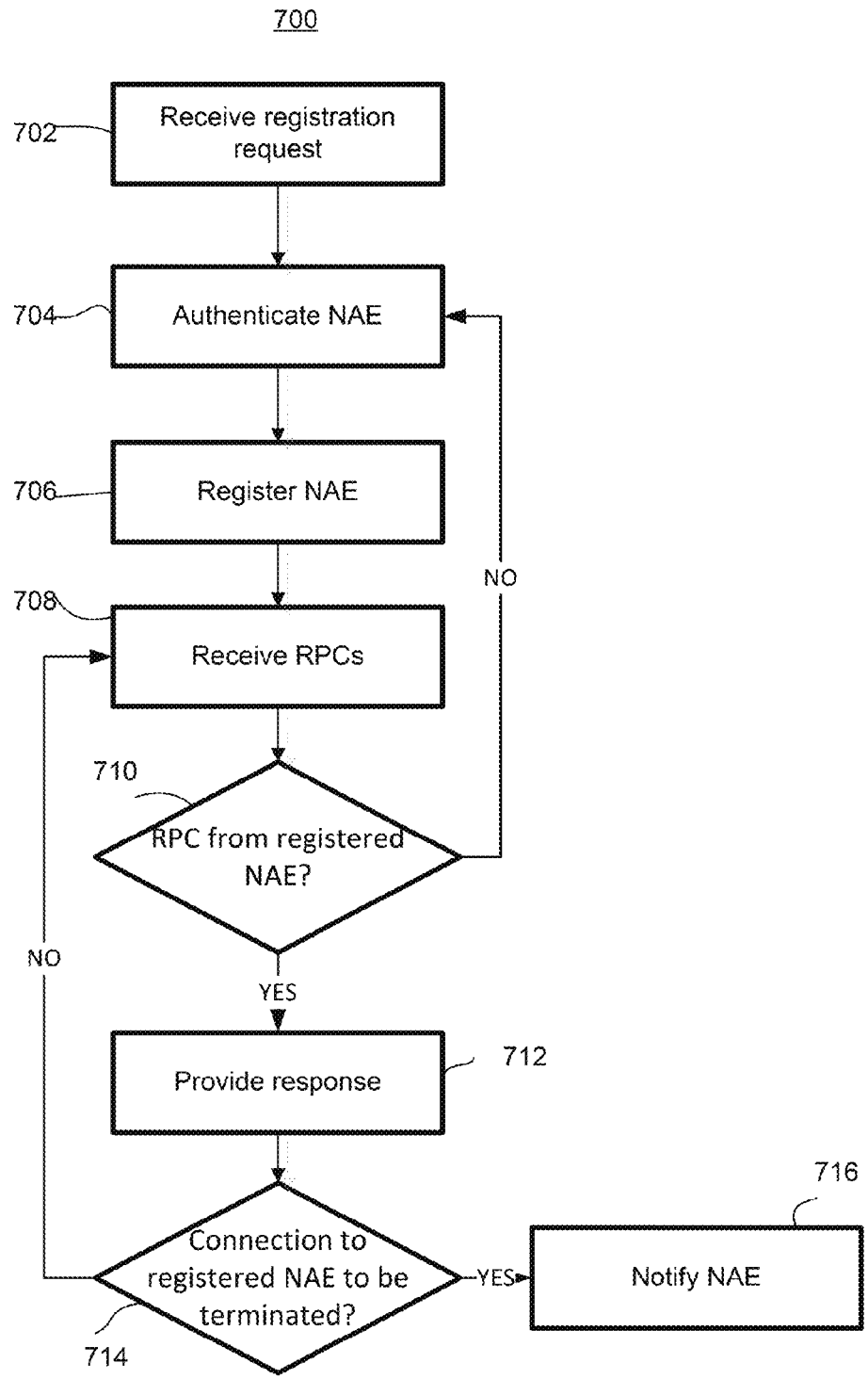
FIG. 7 is another example flow diagram illustrating a method of establishing a connection between an authoritative endpoint and a non-authoritative endpoint according to aspects of the disclosure.

FIG. 7 is an example flow diagram illustrating a method 700 for authenticating and registering non-authoritative entities, and for performing load-shedding. The method 700 may be performed by, for example, a proxy in the authoritative environment. It should be understood that the following operations do not have to be performed in the precise order described below. Rather, various steps may be handled in a different order or simultaneously. Steps may also be added or omitted unless otherwise stated.

In block 702, a registration request is received at the proxy, for example, from a non-authoritative entity. The registration request may be transmitted through a layer on which RPC depends.

In block 704, the proxy may perform authentication procedures for the non-authoritative entity. For example, the proxy may verify an identity of the entity, check for vulnerabilities associated with the entity or the connection, or the like.

In block 706, the proxy registers the non-authoritative entity. For example, the proxy may store a list or other identification of non-authoritative entities that have been authenticated. Such registered non-authoritative entities may be approved for transmission/receipt of RPCs over the established connection. By authenticating and registering the non-authoritative entity at the proxy, the non-authoritative entity is availed of the security infrastructure of the authoritative environment without having to set up a separate firewall or other security protocol on the non-authoritative side.

In block 708, the proxy receives an RPC. The proxy may determine whether the RPC was received from a registered non-authoritative entity (block 710). For example, it may be determined that the RPC was received over the connection established by the registered non-authoritative entity. As another example, the proxy may check a database indicating registered non-authoritative entities to determine whether the received RPC came from one of those entities.

If the RPC is determined to be from a non-authoritative entity, the proxy may attempt to authenticate the entity (block 704). Alternatively, the proxy may simply ignore the received RPC. However, if the received RPC is determined to be from a registered non-authoritative entity, the proxy may provide a response (block 712). For example, the proxy may forward the request to a corresponding authoritative server in the authoritative environment. The corresponding server may be dedicated to handling particular types of requests or requests from given non-authoritative servers or clients. In turn, the proxy may receive a response from the corresponding authoritative server and forward the response to the non-authoritative entity. In some examples, both the request and the response may be chunked into frames prior to sending and reassembled into streams upon receipt.

In block 714, it may be determined whether the connection established with the proxy by the non-authoritative entity is about to be terminated. For example, the proxy may determine that the connection will soon reach its predetermined TTL. In this case, the proxy notifies the non-authoritative entity (block 716) that the connection will soon be terminated. In this regard, the non-authoritative entity may establish a new connection to the authoritative environment, such as with a new proxy. Once the TTL for the connection is over, the connection may enter lame duck mode as discussed above in connection with FIG. 6. If it determined in block 714 that a TTL for the connection is not approaching, however, the method 700 may return to block 708 where the proxy continues to send and receive RPCs to and from the non-authoritative entity.

Any of the examples above may be implemented using SPDY protocol. Another approach may be to use a streaming RPC protocol.

The above described systems and methods may be advantageous in that chunking of RPC payloads makes it possible to multiplex the connection and ensure that no one RPC can saturate the connection. It also allows for implementing RPC QoS more effectively. Moreover, having the ability of non-authoritative RPC servers enables all authentication and authorization to be enforced by the entity that is authoritative. Policies can be enforced in one place, without needing them to be fragmented by partially implementing those checks at the non-authoritative end.

The systems, methods and examples described above are advantageous in that they provide for setting fine-grained timeouts and handling the timeouts accurately and in a computationally efficient manner. As such, they accommodate latency-sensitive applications better than existing network timeout mechanisms. These systems and methods may also allow future and existing applications to function more quickly and reliably by detecting network timeouts faster and avoiding wasted time.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for establishing a connection, comprising:
   receiving, at an authoritative entity in a first infrastructure, a registration request from a non-authoritative server in a second infrastructure, the request received through a transport layer on which a remote procedure call (RPC) layer depends, the request establishing connection with the authoritative entity;
   authenticating, by the authoritative entity the non-authoritative server;
   registering, at the authoritative entity, the non-authoritative server, wherein the registering comprises storing an identification of the non-authoritative server in a data structure listing registered non-authoritative entities;
   receiving a RPC at the authoritative entity from a client device, the RPC served through the non-authoritative server;
   determining, by the authoritative entity, whether the RPC was received from one of the registered non-authoritative entities in the data structure;

providing a response to the RPC when it is determined that the RPC was received from one of the registered non-authoritative entities;

notifying, by the authoritative entity, the non-authoritative server of an impending connection termination, wherein the notifying comprises indicating an amount of time left before the authoritative entity transitions into a given mode: and serving, by the authoritative entity, only in-flight RPCs received through the non-authoritative server once the authoritative entity transitions into the given mode.

2. The method of claim 1, wherein the connection established with the authoritative entity has a predetermined finite time to live (TTL).

3. The method of claim 2, wherein notifying the non-authoritative server of the impending connection termination occurs when the predetermined finite TTL is reached.

4. The method of claim 1, wherein providing the response to the RPC further comprises:

chunking the payload of the response into frames; and transmitting the frames to the non-authoritative server over the established connection.

5. The method of claim 1, wherein providing the response to the RPC comprises providing the response to the RPC to the non-authoritative server for further sending to the client devices.

6. A system, comprising:

an authoritative entity in a first infrastructure, the authoritative entity comprising:

a memory; and one or more processors in communication with the memory, the one or more processors programmed to:

receive a registration request from a non-authoritative server in a second infrastructure, the request received through a transport layer on which a remote process communications (RPC) layer depends, the request establishing connection with the authoritative entity;

authenticate the non-authoritative server;

register the non-authoritative server, wherein the registering comprises storing an identification of the non-authoritative server in a data structure listing registered non-authoritative entities;

receive a RPC from a client device, the RPC served through the non-authoritative server;

determine whether the RPC was received from one of the registered non-authoritative entities in the data structure;

provide a response to the RPC when it is determined that the RPC was received from one of the registered non-authoritative entities;

notify the non-authoritative server of an impending connection termination, the notifying comprises indicating an amount of time left before the authoritative entity transitions into a given mode: and serve only in-flight RPCs received through the non-authoritative server once the authoritative entity transitions into the given mode.

7. The system of claim 6, wherein the one or more processors are further programmed tot determine whether the connection established by the non-authoritative server will be terminated.

8. The system of claim 7, wherein the connection established with the authoritative entity has a predetermined finite time to live (TTL).

9. The system of claim 8, wherein notifying the non-authoritative server of the impending connection termination occurs when the predetermined finite TTL is reached.

10. The system of claim 6, wherein in providing the response to the RPC, the one or more processors are further programmed to:

chunk the payload of the response into frames; and transmit the frames to the non-authoritative server over the established connection.

11. The system of claim 6, wherein in providing the response to the RPC the one or more processors are further programmed to provide the response to the RPC to the non-authoritative server for further sending to the client devices.

* * * * *